United States Patent [19]

Gasztonyi et al.

[11] Patent Number: 5,686,961
[45] Date of Patent: Nov. 11, 1997

[54] AUTOMATIC VIDEO IMAGE DATA REDUCTION AND PRIORITIZATION SYSTEM AND METHOD

[75] Inventors: Laszlo Rainhardt Gasztonyi, Penfield; Amit Gupta, Rochester, both of N.Y.

[73] Assignee: Harris Corporation, Melbourne, Fla.

[21] Appl. No.: 826,422

[22] Filed: Jan. 27, 1992

[51] Int. Cl.$^6$ .................................................. H04N 7/50
[52] U.S. Cl. .......................... 348/390; 348/405; 348/408
[58] Field of Search ........................... 358/133; 382/9; 348/390, 405, 408; H04N 7/133, 7/137

[56] References Cited

U.S. PATENT DOCUMENTS

| | | | |
|---|---|---|---|
| 4,751,742 | 6/1988 | Meeker | 348/408 |
| 4,868,653 | 9/1989 | Golin et al. | 348/390 |
| 5,006,931 | 4/1991 | Shirota | 358/133 |
| 5,079,631 | 1/1992 | Lhuillier et al. | 348/408 |
| 5,103,306 | 4/1992 | Weiman | 358/133 |
| 5,128,776 | 7/1992 | Scorse | 382/9 |
| 5,241,381 | 8/1993 | Kondo | 348/390 |
| 5,295,077 | 3/1994 | Fukuoka | 348/405 |

*Primary Examiner*—Howard W. Britton
*Attorney, Agent, or Firm*—Rogers & Killeen

[57] ABSTRACT

A system and method for processing video imagery. The system automatically selects for transmission, or storage, portions of a video image at an automatically selected compression level, and/or in an automatically selected order. The system and method are intended to supplement and/or replace human actions with autonomous operations that are intended to preserve and prioritize important image information and highly reduce or eliminate image data that does not contain significant information. The preservation of important and relevant image information is given a higher priority than preservation of overall image quality.

16 Claims, 4 Drawing Sheets

AUTOMATIC VIDEO IMAGE DATA REDUCTION AND PRIORITIZATION SYSTEM AND METHOD

BACKGROUND OF THE INVENTION

The present invention relates generally to digital data processing, reduction and transmission techniques. More particularly, it relates to systems and methods for automatically selecting and prioritizing portions of digital video images to be transmitted, and for automatically reducing the amount of digital data in the selected portions.

In a typical video imaging system, a video image to be transmitted or stored is divided into an array of picture elements or pixels. Each pixel represents the video image at one small point of the pixel array. In some systems, a pixel may be represented by a single digital bit, either a zero or a one, indicating either the presence or absence of white in the portion of the image represented by the pixel. In more sophisticated systems, each pixel is represented by plural digital bits which permit each pixel to have more than binary values of zero and one. For example, if four bits are used to represent a pixel then the pixel may have up to sixteen different values, generally ranging from white to black. Each increment from one to sixteen in the binary digits often represents a darker or lighter shade of gray transitioning from white to black. Finally, in color systems, each pixel may be represented by three or four sets of plural digital bits, each of the plural digital bits of a set representing the amount of one of the primary colors (e.g., red, blue or green) present at the portion of the visual image represented by the pixel. Such a scheme is often utilized in digitizing television images.

A standard United States broadcast color television picture may be adequately digitized into an image 768 pixels wide and 486 pixels high with each pixel having a depth of 24 bits (8 bits each of red, blue and green). Each screen image then contains approximately 375,000 pixels or approximately 9 million bits of digital data. While such large amounts of data can readily be sent by large bandwidth transmission and receiving equipment, it is often desired to send such digital video images by less expensive and more readily available low speed equipment, such as HF (High Frequency) radio and telephone voice lines. Such low speed devices typically operate at anywhere from 1200 to 9600 bits per second. If a single digital television image is sent via such a low speed transmission link, for example, a 2400 bps link, approximately 65 minutes would be needed to send a single image. Further, the storage requirements of this amount of data limits the reasonable number of images that can be stored on a mass storage device, such as a hard disk drive found in computers.

It is therefore desirable that some form of data reduction, or compaction, be applied to the imagery data in order to reduce storage and transmission requirements. Many compaction techniques exist, some are lossless in nature, others are lossy. The lossy techniques offer superior compaction performance over the lossless techniques, although some information from the original imagery may be lost after the inverse compaction technique is applied. Further, the performance of the compaction technique varies based on the imagery, since most compaction techniques are data dependent.

Many of the known image transmission and compaction systems transmit or store an entire screen of data. Often, however, only certain portions of the screen are of interest to the recipient of the information and some portions of the image may be of more importance than others. Known video systems do not include automatic provisions for transmission or storage of only selected portions of the video image or for transmission or storage of different portions of the image at different resolutions and/or compressions. U.S. patent applications Ser. No. 531,637 and Ser. No. 367,365 of Scorse, et al. filed Jun. 1, 1990 and Jun. 16, 1989, respectively, both owned by the assignee of this application, disclose a system wherein the operator of the system may manually select the resolution, compression and order of transmission of portions of the image and these disclosures are incorporated herein.

The present invention replaces operations normally performed by a human operator with an autonomous process. The autonomous process emulates actions normally taken by a human operator to reduce the amount of image data required for storage or transmission. The reduction is achieved by preserving significant regions of the image, and greatly reducing or entirely eliminating regions that are considered to have less relevant information.

Several adaptive digital data coding schemes for reducing the amount of data in a video image have been proposed (Chen, Wen-Hsiung and Smith, C. Harrison in "Adaptive Coding of Monochrome and Color Images", *IEEE Transactions on Communications*, Vol. Com-25, No. 11, November 1977; and Kong, Seong-Gon and Kosko, Bart in "Fuzzy Image Transform Coding", *Neural Networks and Fuzzy Systems*, Prentice Hall), but such known schemes limit their view of the data to a single kernel of image data.

A kernel is a fixed size of image space over which data reduction is performed. Typically, the variances of components of the kernel are used as a metric for determining the amount of useful information in the kernel. High variances within a kernel indicate a high degree of busyness. However, in many instances busyness does not indicate the presence of useful information. The system and method of the present invention consider the characteristics of neighboring kernels to determine the level of data reduction in the kernel under consideration. For example, the image of a man standing in front of a finely checkered wall may have higher variances in the kernels of the data representing the wall than found in the kernels representing the man. However, it is far more likely that the man is of greater interest and that the region representing the wall is of less importance.

It is accordingly an object of the present invention to provide a novel system and method for automatic video image data reduction.

It is yet a further object of the present invention to provide a novel system and method of video image reduction and transmission or storage, whereby the portion of the image of most interest to the user is automatically selected and transmitted or stored first.

It is another object of the present invention to provide a novel method and system for video image data reduction in which the amount of image data in a kernel is automatically reduced and in which the data reduction in the kernel is made in consideration of image data in proximate kernels.

It is still another object of the present invention to provide a novel video image system and method in which the operator of a video transmission system is made aware of the progress of the transmission of video image data and of compression and priority levels.

These and many other objects and advantages of the present invention will be apparent from the claims and from the detailed description of the preferred embodiments when read in conjunction with the appended drawings.

DETAILED DESCRIPTION OF THE PREFERRED EMBODIMENTS

Figure 1:
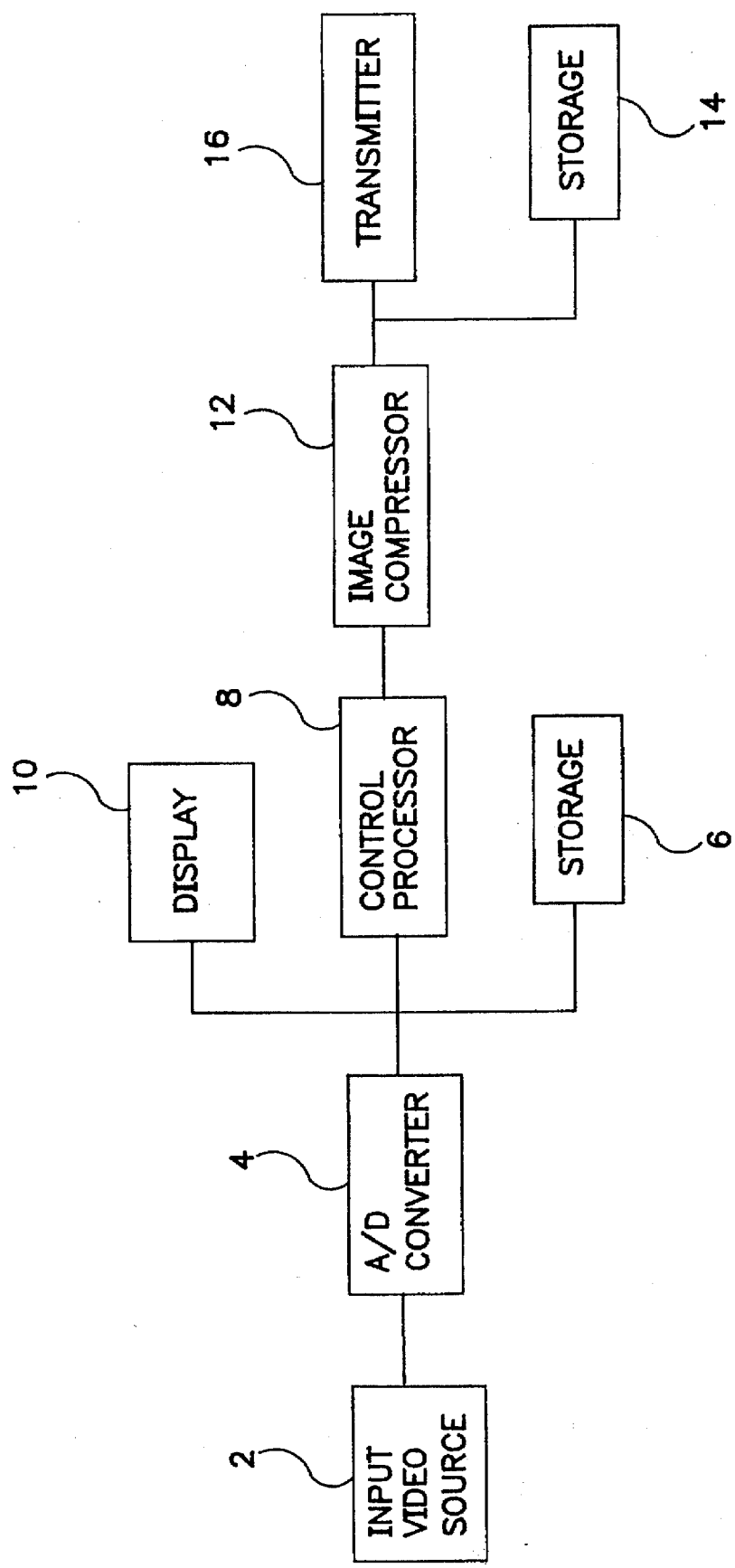
FIG. 1 is a functional block diagram of a video processing, transmission and storage system which may use the system and method of the present invention.

With reference to FIG. 1, a video input device 2 may receive or generate a video signal in a conventional analog signal format in correspondence to a sensed visual image. The signal may be color encoded.

The analog signal from the video input device 2 may be digitized by a digitizer 4 which periodically produces a digital signal related to the gray level and/or the color of the video input signal. The digital signals produced by the digitizer 4 may be stored in a storage device 6 (such as a frame buffer) in an array which has reference to the position of each of the digital signals within the image being provided by the video input device 2. Accordingly, each of the digital signals may be considered a picture element, or pixel, relating the video image seen by the video input device 2 to a particular position within the entire video image, and the digital storage array may be considered a digital map of the visual image. In a U.S. standard NTSC television signal, for example, the video input signal is often stored in an array which has 768 pixels horizontally and 486 pixels vertically. However, the exact number of pixels into which a visual image is divided is not significant to the present invention. Additionally, the means by which the imagery data is accumulated in the storage device are not of importance to the present invention.

The pixels may be related to the gray level of the visual image, i.e., how white or how black the image is, and/or it may be related to the color of the image, i.e., how much of the colors red, green, and blue are detected by the detectors within the video input device 2.

Once the pixels are stored in the storage device 6, they may be acted upon by the control/processing unit 8, to be discussed in more detail below. The video signal represented by the stored pixels and made available to the control/processing unit 8 may be displayed on a monitor 10. The stored pixels may be acted upon by an image compressor 12 and the reduced data may then be stored on a storage device 14. The data may also be transmitted to some other location by the use of conventional digital transmission equipment 16, such as radio wave or leased line.

The control/processing unit 8 directs the image compressor 12 to provide the digitally coded image data to the storage device 14 for storage or to the transmission equipment 16 which may transmit the data in any conventional format. In the above-identified copending applications and in an override capacity in the present invention, the control/processing unit 8 may be human driven to select the compression levels and priority of different regions for transmission or storage.

Figures 2, 3:
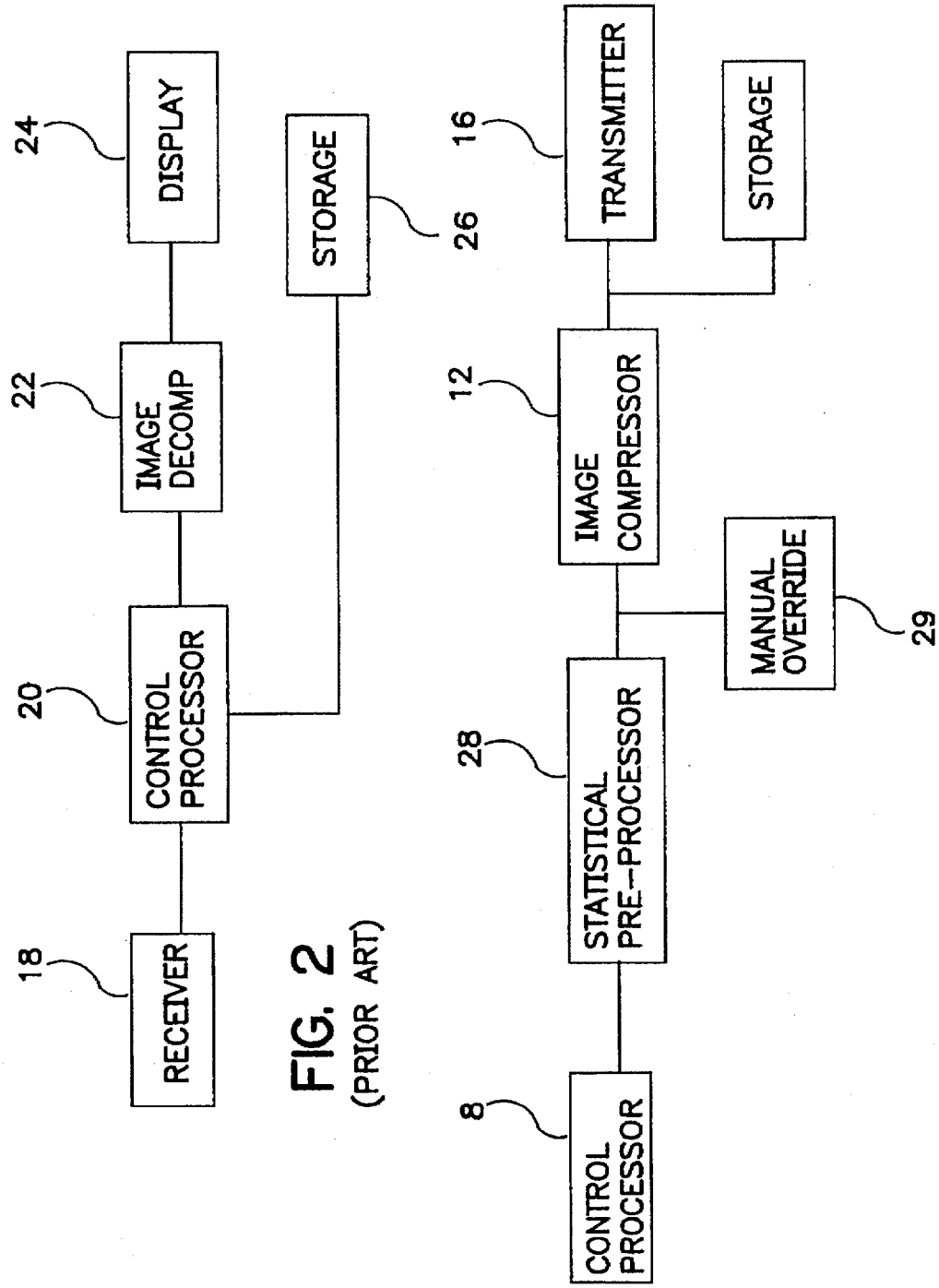
FIG. 2 is a functional block diagram of a video imaging receiver which may use the system and method of the present invention.
FIG. 3 is a functional block diagram of an autonomous statistical driven pre-processor and image compressor of the present invention which may be utilized in the system of FIG. 1, replacing human controlled operations.

With reference now to FIG. 2, when the transmitted signal is received at a receiver 18 any carrier signal or the like which may have been used during the transmission is removed. The image signal is provided to a receiver control/processing unit 20. The receiver control/processing unit 20 may provide the compressed data to an image decompressor 22 for expansion to the canonical form for use in a display 24 or to a storage device 26 for future retrieval.

The video input device 2 in FIG. 1 may be any conventional video input unit such as a black-and-white television camera, a color television camera, a facsimile machine, an optical scanner, or similar device which converts visual or optical imagery into an electrical or electromagnetic signal. The storage devices 6, 14 and 26, and the control/processing units 8 and 20 may be conventional computer or personal computer storage and control systems. The display monitors 10 and 24 may be conventional television monitors (black-and-white, monochrome, or color) or similar devices on which a visual image may be obtained from electronic signals.

In the system and method of the present invention the control/processing unit 8 may be augmented by an autonomous statistical pre-processor that does not require user intervention. With reference to FIG. 3, the control/processing unit 8 may feed video image to a statistical pre-processor 28. The statistical pre-processor 28 performs four primary tasks; region classification, compression algorithm selection, compression level selection and region prioritization.

Region Classification. The statistical pre-processor 28 classifies regions based on an evaluation of one or more characteristics of that region. The characteristics may be selected from known indicators. Statistical measures are desirable, with probability density functions (PDF) being preferred. In a preferred embodiment co-occurrence matrices are used. A co-occurrence matrix is an estimate of the second order PDF over a single region of image under the assumption that the PDF depends only on the relative position of the pixels. It has been found that two regions having similar second-order statistics will usually appear to human eyes to have similar textures. For example, regions such as grass, water, sky and other repetitive structures have second order statistics which are analogous to the texture of cloth.

Figure 4:
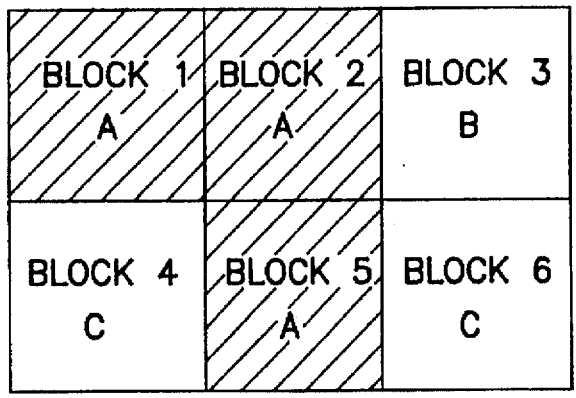
FIG. 4 illustrates the partitioning of a video image into regions.

In the present invention the characteristics of adjacent blocks are considered in the data reduction scheme. Each region's size may be grown by combining blocks until a significant variation in the characteristics is found. Consider a portion of an image as shown in FIG. 4. In order to determine the size and shape of regions, the co-occurrence matrix is calculated over a minimum fixed block size. Typically, this size will be on the order of sixteen pixels in both horizontal and vertical directions. For example, the co-occurrence matrices may be calculated over the six blocks shown in FIG. 4. A metric is defined for a similarity test and the coefficient magnitudes of the co-occurrence matrix and the location of large magnitude coefficients noted. Blocks are identified to be similar if:

1) the sums of the coefficients of the co-occurrence matrix of two blocks are within a given range, and
2) the distribution of similarly valued coefficients in the two co-occurrence matrices are close.

Assume the co-occurrence matrices of blocks 1, 2 and 5 in FIG. 4 have similar sums and distributions, A. Blocks 3, 4 and 6 have sums and distributions B, B and C respectively. Blocks 1, 2 and 5 are merged to form a single region (indicated by shading) since they have similar second order statistics. Blocks 3 and 6 do not meet the similarity metric required to form a region, and thus Blocks 3 and 6 form unique separate regions. Although Blocks 4 and 6 have similar co-occurrence matrices, they are not adjacent, and therefore cannot be merged to form a region. Other statistical approaches may be used to perform region classification in a similar manner.

Compression Algorithm Selection. Once the entire image has been partitioned into regions, the data in individual regions may be compressed in the image compressor 12 by using different compression techniques selected in the statistical pre-processor 28. Various approaches may be used to select the appropriate compression algorithm for a given region, including the size of the region, and the sum of the coefficient magnitudes.

Low resolution compression methods may be used if a lack of important information may be assumed, as when a plurality of blocks were merged to form a region. A low resolution compaction algorithm which yields good results is one based on the Discrete Cosine Transform (DCT). In the above example, the DCT based algorithm may be applied to Blocks 1, 2 and 5. Other compression algorithms can be used as well. In the case of a region consisting of a single block, the summation of the coefficients may be used to determine the compression technique. A high resolution compression algorithm may be selected for regions where the coefficient summation of the co-occurrence matrix exceeds a magnitude criteria. That is, if:

$$S=|C(i,j)|,$$

where $C(i,j)$ is the coefficient summation of the co-occurrence matrix, and $X1<S<X2$, where $X1$ and $X2$ are predetermined thresholds for compression algorithm selection. Medium compression techniques, such as the Wavelet transform, and mild compression techniques, such as Differential Pulse Code Modulation (DPCM) may be used as appropriate.

Figure 5:
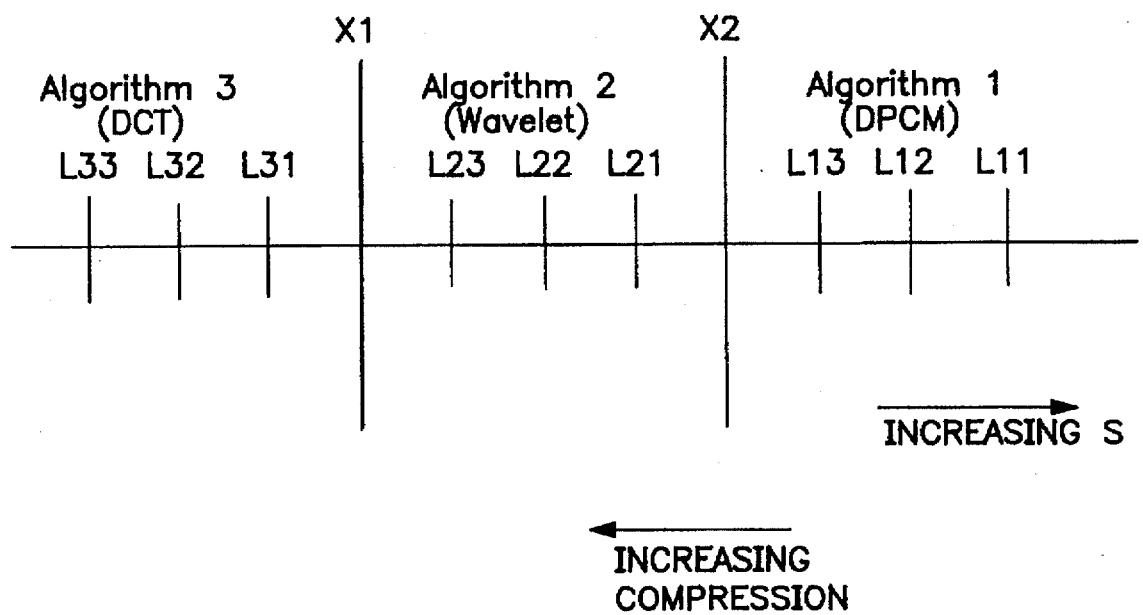
FIG. 5 illustrates an embodiment of the method of the selection of compression levels of the present invention.

Compression Level Selection. Once the compression algorithm has been selected for a region, the compression level may be determined. With reference to FIG. 5, the compression level may be selected by partitioning the range of the coefficient summation of the co-occurrence matrix into different levels. The magnitude of compression is mapped to these different levels. That is, the level of compression applied by a selected compression algorithm may vary depending on the evaluated characteristic of the data. For example, mild compression may be applied when the summation is large, and coarse compression may be applied when the magnitude of the summation is small. This mapping is used for any selected algorithm.

By way of example, and with reference to FIG. 5, if S is less than X1, a DCT compression algorithm may be used. Within this algorithm;

a coarse compression may be chosen if $S<L33$, a medium compression may be chosen if $L33<S<L32$, and a mild compression may be chosen if $L32<S<L31$.

For $X1<S<X2$, a Wavelet transform may be chosen, and for $S>X2$, a DPCM algorithm may be chosen.

Region Prioritization. With the determination of the compression algorithm and levels for each region, the priority for each region may be selected. The priority is based on the selected compression algorithm and the compression level. Regions compressed with the high resolution compression algorithm and mildest compression level ($S>L11$ in the above example) are assigned highest priority. Likewise, regions compressed with the low resolution compression algorithm and the most coarse compression level ($S<L33$ in the above example) are assigned the lowest priority for transmission or storage.

Alternatively, the statistical pre-processor 28 may use frequency domain characteristics for region classification, compression and prioritization. Metrics similar to those used with the co-occurrence matrix can be used with a frequency domain matrix. For example, the energy content of the blocks may be used for region classification and compression level determination. Image data may be transformed from the spacial domain to a two dimensional frequency space so that energy variations in the data may be analyzed. The background energy level, known as the DC energy, may be determined and removed so that only the variations, known as the AC energy, remain. A high energy content (large magnitude coefficients in the frequency domain) indicates there is information in the block, whereas low energy content indicates there is less information. As before, the frequency distribution over the block and over its adjacent blocks may be compared for region classification. If several adjacent blocks have similar frequency coefficient distributions, it may be concluded that the imagery in the blocks are of less importance, irrespective of absolute energy content. An advantage of a frequency domain metric is that the number of calculations required during the autonomous process may be reduced if the frequency domain transform used is the same as one of the compression algorithm kernels (e.g., using the DCT).

Data reduction in the regions may be directly or inversely related to the energy content, depending on the operating environment and user needs. Further embodiments may include evaluations of the rate of change of energy and/or the periodicity of the changes.

Figure 6:
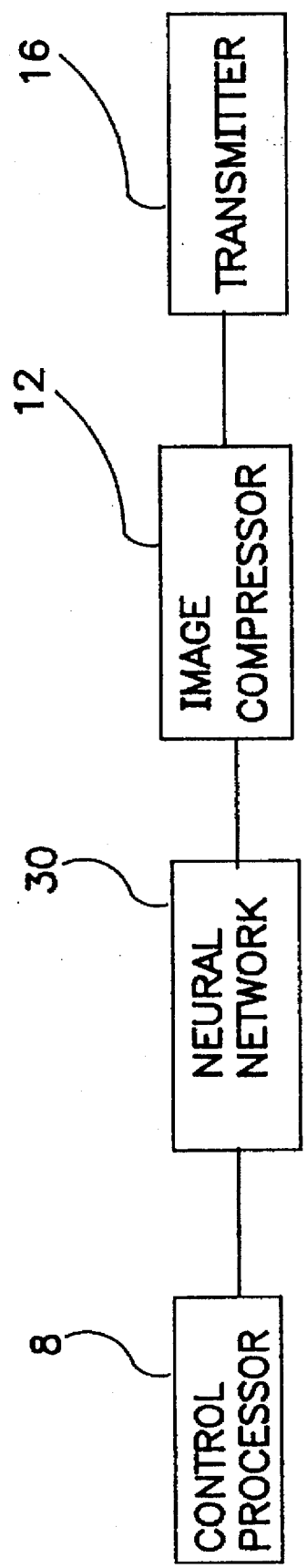
FIG. 6 is a functional block diagram of a neural net driven pre-processor and image compressor of the present invention which may be utilized in the system of FIG. 1.

With reference now to FIG. 6, the statistical pre-processor may be replaced by a neural network 30. The neural network performs all of the functions of the statistical pre-processor and may be trained for different classes of images. The neural net may divide the image into sub-regions and assign the compression algorithm, compression level, and priority level for each of the regions respectively.

For example, a multilayer perceptron may be used for image region classification. The multilayer perceptron is trained under supervision using a backpropagation algorithm. However, different neural nets may be used to perform the same functions. The neural net 30 may be trained for a broad class of images for global optimality, or may be trained for a specific class of imagery to obtain highly optimal performance for a narrow class. Thus, the neural net may be trained for the classes of images in the operating environment of the user.

Upon selection of the region classification, compression algorithm and level and region priority, the image may be sent to the image compressor 12 (FIGS. 3 and 5). The image regions are compressed in prioritized order with the assigned compression algorithm and level. The resultant compressed data stream is then formatted for either storage or transmission. The format information may be provided with the data so that a single transmission may be sufficient to allow for decoding of the compressed data stream by a de-compressor 22 (FIG. 2).

In the event the data is to be transmitted, a human operator may be made aware of the progress of the transmission by monitoring the shape of the regions and the compression algorithm and level selected on a display. Conventional non-destructive "shading" of the regions may be used to indicate transmission, classification, compression and the like. For example, regions most compressed may be shaded red, while least compressed regions may be shaded blue. Regions that were not transmitted at all (an infinitely coarse compression level) may be shaded black. In this way the operator may be made aware of the pre-processor's selections. Additionally, as the compressed data which corresponds to a given region is transmitted the region may be shaded light grey. Other conventional means to inform an operator may be used as well, such as tabular description.

The automatic selections made by the present invention may be overridden by an operator if the operator is not satisfied with the selection made by the autonomous system. The above-described shading techniques may be used to indicate the compression algorithm, compression level and/or region priority and size as selections are made by the statistical pre-processor. With reference to FIG. 3, the user can specify the desired compression algorithm and level for a specific region by using conventional means 29 to override the automatic selections.

In order to increase the probability of reception when using high bit error rate channels, a robust adaptive communications protocol may be used. The progress of the transmission can be made known to an operator through visually descriptive means, such as by re-shading corrupted regions.

The system of the present invention maybe used in a wide variety of visual communication systems, particularly, although not necessarily, when some portions of the communication system are not within line-of-sight of other portions. One of the advantages of a system of the present invention is the ability to use relatively narrow-bandwidth communication devices (such as telephone lines, HF radio links, optical cable, etc.) in the transmission of visual imagery without the consumption of inordinate periods of time.

The system of the present invention may readily be utilized within the large, existing network of low speed communications, such as the vast telephone systems and within the bandwidth limits of existing communications equipment such as cellular, narrowband satellite, line of site, and HF radio links.

The present invention may be embodied in other specific forms without departing form the spirit or essential characteristics thereof. The presently enclosed embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

We claim:

1. A method of processing digital data representative of a video image comprising the steps of:

(a) dividing the data into a plurality of blocks representing a region of the video image;

(b) automatically evaluating a predetermined characteristic of the data in each block to provide a processing signal indicative of the evaluated characteristic for each block;

(c) displaying the video image on a monitor;

(d) indicating the processing signal for each block on the monitor;

(e) selectively manually overriding the processing signal; and (f) processing the data in accordance with the automatically provided processing signals as manually overridden.

2. The method of claim 1 wherein the processing signal for each block is indicated on the monitor by shading.

3. The method of claim 1 wherein the processing includes the transmission of the data.

4. The method of claim 1 wherein the processing includes compression of the data.

5. The method of claim 4 wherein the processing includes transmission of the compressed data in an automatically determined order.

6. The method of claim 4 wherein the type of compression is responsive to the processing signal.

7. A method of automatically determining the degree of reduction of the amount of data representative of a video image comprising the steps of:

(a) dividing data representative of a video image into a plurality of blocks representing a region of the video image;

(b) providing a neural net;

(c) training said neural net by operator evaluation of a plurality of subject matter related subimages both as to region and significance of the data within the region;

(d) determining the significance of the data in each of said blocks by reference to the neural net; and (e) compressing the data in each of said blocks to a degree related to the determined significance.

8. The method as defined in claim 7 wherein the step of training the neural net comprises the step of training the neural net with a narrow set of test data for the classification of similar images.

9. The method as defined in claim 7 wherein the step of training the neural net comprises the step of training the neural net with a broad set of test data for the classification of widely varying images.

10. A system for processing blocks of digital data representative of regions of a video image comprising:

automatic means for evaluating a predetermined characteristic of the data in each block to provide a processing signal indicative of the evaluated characteristic for each block;

a monitor for displaying the video image;

means for indicating the processing signal for each block on the monitor;

manual selection means for selectively overriding the processing signal; and processing means for processing the data in accordance with the automatically provided processing signals as manually overridden.

11. The system of claim 10 wherein the processing signal for each block is indicated on the monitor by shading.

12. The system of claim 10 wherein the processing means includes means for transmitting the data.

13. The system of claim 10 wherein the processing means includes means for compressing the data.

14. The system of claim 13 wherein the processing means includes means for transmitting the compressed data in an automatically determined order.

15. The system of claim 13 wherein the means for compressing the data compresses the data responsively to the processing signal.

16. A system for automatically determining the degree of reduction of the amount of data in a plurality of blocks, each representative of a portion of a video image comprising:

a neural net for evaluating a plurality of subject matter related subimages in the video image;

means for determining the significance of the data in each of said blocks by reference to the neural net; and means for compressing the data in each of said blocks to a degree related to the determined significance.

* * * * *